(12) United States Patent
Hall

(10) Patent No.: US 9,197,942 B2
(45) Date of Patent: Nov. 24, 2015

(54) TELEVISION RECEIVER CLOUD SERVICE AUGMENTATION

(71) Applicant: EchoStar UK Holdings Limited, Keighley (GB)

(72) Inventor: Neale Hall, Keighly (GB)

(73) Assignee: ECHOSTAR UK HOLDINGS LIMITED (GB)

( * ) Notice: Subject to any disclaimer, the term of this patent is extended or adjusted under 35 U.S.C. 154(b) by 34 days.

(21) Appl. No.: 13/722,608

(22) Filed: Dec. 20, 2012

(65) Prior Publication Data

US 2014/0181866 A1 Jun. 26, 2014

(51) Int. Cl.
| | |
|---|---|
| H04N 21/482 | (2011.01) |
| H04N 21/4623 | (2011.01) |
| H04N 21/433 | (2011.01) |
| H04N 21/4147 | (2011.01) |
| H04N 21/2225 | (2011.01) |
| H04N 21/2747 | (2011.01) |
| H04N 21/61 | (2011.01) |
| G06F 21/10 | (2013.01) |

(52) U.S. Cl.
CPC ............. *H04N 21/482* (2013.01); *G06F 21/10* (2013.01); *H04N 21/2225* (2013.01); *H04N 21/2747* (2013.01); *H04N 21/4147* (2013.01); *H04N 21/4332* (2013.01); *H04N 21/4623* (2013.01); *H04N 21/6143* (2013.01)

(58) Field of Classification Search
CPC ............... H04N 21/23109; H04N 21/2543; H04N 21/47211; H04N 21/4147; H04N 21/2225; H04N 21/4332; H04N 21/2747; H04N 21/4623; H04N 21/43622; H04L 63/10; H04L 63/0428; H04L 63/08; H04L 12/2838; H04L 2012/285; H04L 2463/101; H04L 63/102
USPC ........... 725/38, 39, 48, 54, 56, 57, 60, 61, 63, 725/74, 86, 91, 135, 138, 143, 144
See application file for complete search history.

(56) References Cited

U.S. PATENT DOCUMENTS

2014/0007146 A1* 1/2014 Peterson et al. .................. 725/5
2014/0025537 A1* 1/2014 Venkataramu et al. .... 705/26.61

* cited by examiner

*Primary Examiner* — Pankaj Kumar
*Assistant Examiner* — Alazar Tilahun
(74) *Attorney, Agent, or Firm* — Kilpatrick Townsend & Stockton LLP

(57) ABSTRACT

The configuration of television receivers in a content distribution network. The configuration may include selectively enabling or disabling access by a particular television receiver to a particular cloud computing service. The enabling or disabling may be implemented by user-interaction with a guide that lists cloud computing services each configured to provide particular applications and services over a data network.

15 Claims, 6 Drawing Sheets

TELEVISION RECEIVER CLOUD SERVICE AUGMENTATION

BACKGROUND

Technology acceptance or adoption in many instances is a function of cost associated with entry into a particular technology or market. For example, consumers may be less inclined to invest in a particular system or device when a less expensive alternative is available, or when cost associated with technology adoption is prohibitively expensive. Accordingly, it may be beneficial for technology providers to lower the adoption barrier of new or advancing technologies.

SUMMARY

This Summary does not in any way limit the scope of the claimed subject matter.

In an aspect, a method for configuring television receivers in a content distribution network is disclosed. The method may include receiving, at a television receiver from a computing system over a television broadcast network, data associated with an interactive guide that lists cloud computing services each configured to provide particular applications and services over a data network. The method may further include outputting, from the television receiver to a display, the interactive guide for presentation to at least one customer of a particular television provider. The method may further include transmitting, from the television receiver to the computing system in response to a user-initiated activation request, a subscribe message to enable access by the television receiver to a particular cloud computing service listed within the interactive guide. The method may further include transmitting, from the television receiver to the computing system in response to a user-initiated deactivation request, an unsubscribe message to disable access by the television receiver to a particular cloud computing service listed within the interactive guide.

In another aspect, a television receiver is disclosed. The television receiver may include a module configured to transmit a subscribe message to enable access by the television receiver to a particular cloud computing service listed within an interactive guide. The television receiver may further include a module configured to transmit an unsubscribe message to disable access by the television receiver to a particular cloud computing service listed within the interactive guide.

In yet another aspect, a computing device including at least one processing unit, and at least one system memory connected to the at least processing unit is disclosed. The system memory may include instructions that, when executed by the processing unit, cause the processing unit to implement a module configured to receive, from a computing system over a satellite television network, data associated with an interactive guide that lists cloud computing services each configured to provide particular applications and services over a data network. The system memory may further include instructions that, when executed by the processing unit, cause the processing unit to implement a module configured to output to a display the interactive guide for presentation to at least one customer of a particular satellite television provider. The system memory may further include instructions that, when executed by the processing unit, cause the processing unit to implement a module configured to transmit a subscribe message to enable access by the computing device to a particular cloud computing service listed within an interactive guide. The system memory may further include instructions that, when executed by the processing unit, cause the processing unit to implement a module configured to transmit an unsubscribe message to disable access by the computing device to a particular cloud computing service listed within the interactive guide.

DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. When only the first reference label is used in the specification, the description is applicable to any one of the similar components having the same first reference label irrespective of the second reference label.

DETAILED DESCRIPTION

Figure 1:
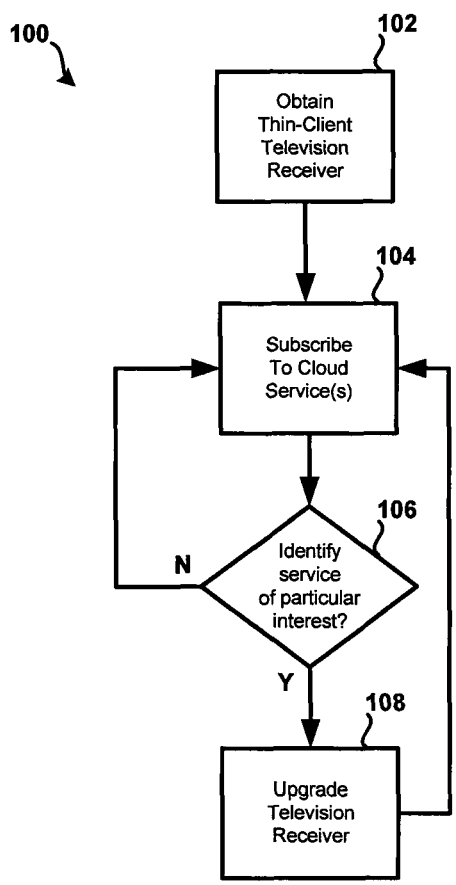
FIG. 1 shows an example workflow for consumer technology adoption in accordance with the principles of the present disclosure.

The present disclosure is directed to systems and methods for augmenting a particular computing device platform to support interactions with one or more cloud computing services. Although described in the context of a television receiver and a satellite-based content distribution system, the various aspects of the present disclosure may generally be applicable to any scenario in which it is desirable to provide a lightweight, relatively inexpensive "introduction" device or system as an option to a particular consumer base. Such an implementation may be beneficial in many respects including, for example, "lowering" the barrier for technology adoption, while simultaneously offering consumers a mechanism to "test drive" certain features or functionality prior to, or as an alternative to, upgrading to a more sophisticated device or system. For example, and referring now to FIG. 1, an example workflow 100 for consumer technology adoption is shown in accordance with the principles of the present disclosure.

At step 102, a particular consumer may obtain a "thin-client" television receiver, which may itself be associated with a particular billing account of a particular television provider. The television receiver may be configured to exhibit minimal functionality or features required for use in a media content distribution system. For example, the television receiver may include a single tuner, along with an audio/video decoder, such as to enable the television receiver to tune to a particular television channel(s) transmitted, and to convert encoded video/audio into a format suitable for output to a display device. In this example, the television receiver may further include an Ethernet port, along with a web browser or lightweight desktop or application, to enable the television receiver to connect with a particular network, such as the Internet, and also enable a user to access and interact with various computing resources (hardware and software) that are delivered as a service over the particular network as part of a "cloud computing" implementation. Other embodiments are possible.

At step 104, the consumer may selectively subscribe to one or more cloud computing services, such that the services are accessible to the television receiver, to "test drive" functionality offered by the same. In general, the "test drive" may occur for a predetermined time period (e.g., as defined by terms of a "subscription" to a particular cloud computing service), and may be performed in lieu of upgrading the hardware of the television receiver, or the television receiver itself, to exhibit functionality otherwise offered by the service(s). In this example, a computing platform of the "thin-client" television receiver may be configured to support essentially any type of cloud computing service such as, for example, an IaaS (Infrastructure as a service), a PaaS (Platform as a Service), a SaaS (Software as a Service), a STaaS (Storage as a Service), a SECaaS (Security as a Service), a DaaS (Data as a Service), a DBaS (Database as a Service), a TEaaS (Test Environment as a Service), Desktop Virtualization, an APIaaS (API as a Service), and a BaaS (Backend as a Service). Still other embodiments are possible.

At step 106, the consumer may, at some point, decide whether a particular feature or functionality offered by a particular cloud service is of sufficient interest to justify or provoke the consumer to upgrade the "thin-client" television receiver to a "more" sophisticated television receiver. The "more" sophisticated television receiver may exhibit, at least in part, the particular feature or functionality of interest. For example, in one embodiment, and assuming that the particular cloud service is a DVR-like (Digital Video Recorder) service that hosts program recordings "in the cloud," the consumer may upgrade the "thin-client" television receiver to a more sophisticated television receiver that exhibits a multi-tuner DVR platform. However, many other embodiments are possible as well. For example, it is contemplated that any particular feature or functionality that may be provided in a cloud computing implementation may, at least in part, be ported or otherwise incorporated from the "cloud" into a "more" sophisticated television receiver as desired.

Flow within the example workflow 100 may branch from step 106 to step 108 at least upon the consumer deciding to upgrade the "less" sophisticated television receiver to a "more" sophisticated television receiver. The "more" sophisticated television receiver may itself be associated with a particular billing account of a particular television provider. The consumer may additionally unsubscribe to one or more of the cloud services originally subscribed to at step 104. Alternatively, flow within the workflow 100 may branch to step 104 following step 108 (or step 106) in a loop at least until the consumer decides to upgrade a "current" television receiver to a "more" sophisticated television receiver. In this manner, the consumer may be continuously afforded the opportunity to subscribe to existing cloud services, and upgrade a "less" sophisticated television receiver to a "more" sophisticated television receiver as desired.

The example workflow 100 described in connection with FIG. 1 may be beneficial in many respects. For example, the "thin-client" television receiver may provide a relatively inexpensive option for a consumer base to enter a particular television-system-related market, such as satellite television for example. In this example, once a particular consumer is minimally invested, it may be more likely that the particular consumer will upgrade, while maintaining a relationship with a particular satellite television provider, to a more sophisticated television receiver as more features or functionality become available over time. The consumer may benefit from such an arrangement because of a perceived reduced investment required to enter into the satellite television market. The particular satellite television provider may benefit from such an arrangement by acquiring and maintaining a relationship with a consumer/client base that may otherwise be inaccessible.

Further scenarios and beneficial aspects associated with the example workflow 100 of FIG. 1 are described below in connection with FIGS. 2-6.

Figure 2:
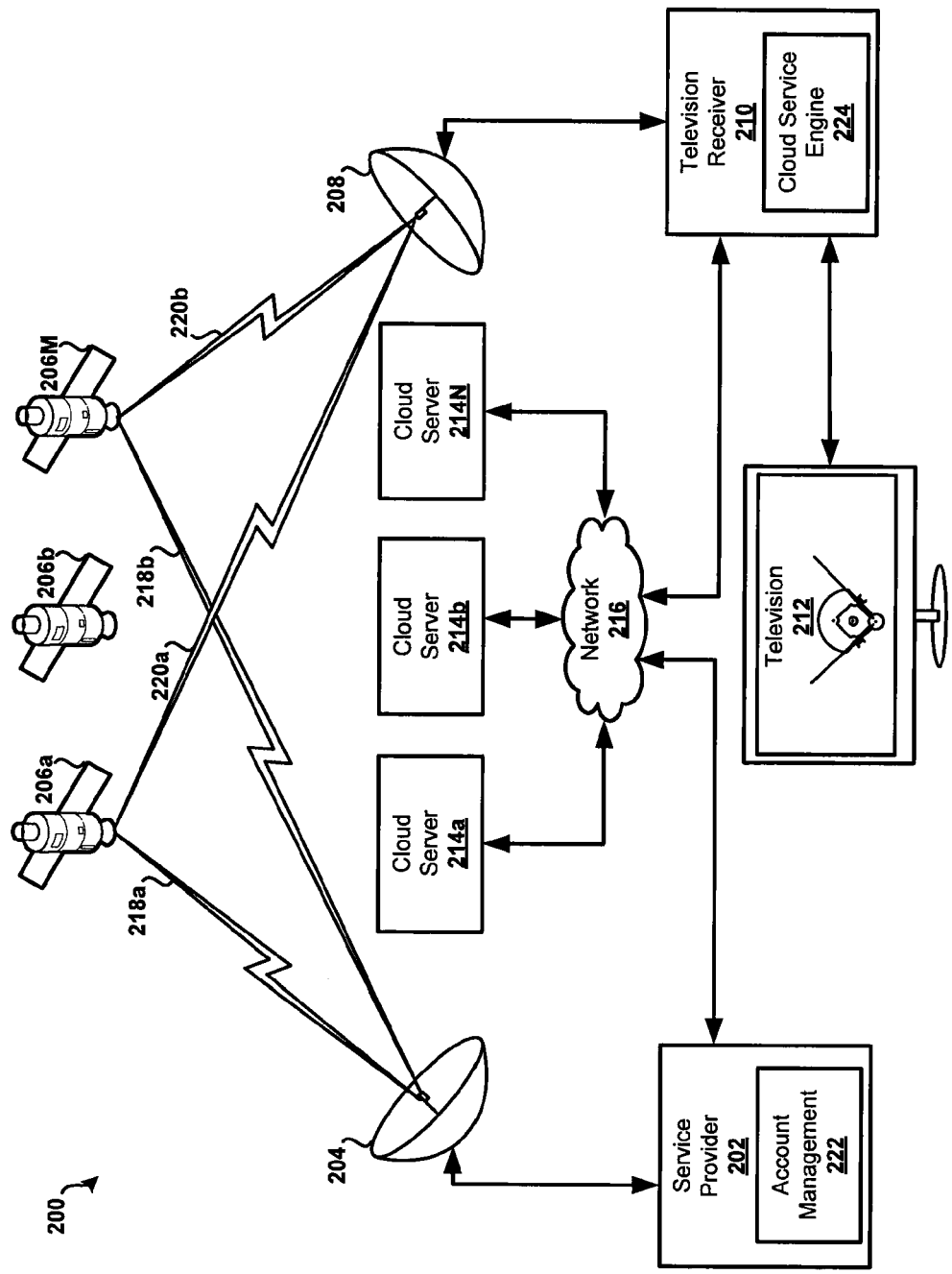
FIG. 2 shows an example media content distribution system.

Referring now to FIG. 2, an example media content distribution system 200 is shown in accordance with the present disclosure. In general, the system 200 incorporates aspects of a home computing network, as well as a satellite-based content distribution network. For brevity, the system 200 is depicted in a simplified and conceptual form, and may generally include more or fewer systems, devices, networks, and/or other components as desired. Further, number and type of features or elements incorporated within the system 200 may or may not be implementation specific, and at least some of the aspects of the system 200 may be similar to a cable television distribution system, or other type of media distribution system.

Further, the "television receiver" as described throughout may be any type of television receiver, such as a set-top-box for example. In another example, the "television receiver" may correspond to functionality integrated into a television, a digital video recorder, a tablet, or any other computing device or system, and variations thereof. Additionally, features and concepts as discussed throughout the present disclosure may be applicable to any type or form of networked computing system environment, and may not be limited to a satellite television system implementation, a cable television system implementation, or other particular implementation.

In the example of FIG. 2, the system 200 includes a service provider 202, a satellite uplink 204, a plurality of orbiting (e.g., geosynchronous) satellites 206a-M (where M is an integer value), a satellite dish 208, a television receiver 210, and a television 212, a plurality of cloud-based servers 214a-N (where N is an integer value), and a network 216. In general, each of the respective cloud-based servers 214a-N may be configured to deliver particular computing resources (hardware and/or software) as a service to the television receiver 210, and/or the television 212, over the network 216 as part of a "cloud computing" implementation. In this example, the network 216 establishes a bi-directional communication path for data transfer between respective components of the example system 200. In particular, the network 216 may incorporate or exhibit terrestrial and/or non-terrestrial network features or elements.

For example, in one embodiment the network 216 may be any of a number of wireless or hardwired packet-based communication networks such as, for example, WAN (Wide Area Network), WLAN (Wireless Local Area Network), Internet, or other types of communication networks such that data may be transferred among respective elements of the example system 200. Additionally, the respective elements of the example system 200, along with the network 216, may be configured such as to be enable communication(s) in accordance with any particular protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/ High-bandwidth Digital Content Protection), etc.

In practice, the satellites 206a-M may be configured to receive uplink signals, such as uplink signals 218a-b, from the satellite uplink 204. In this example, the uplink signals 218a-b may contain one or more transponder streams of particular data or content (e.g., a particular television channel) that is supplied by the service provider 202. For example, each of the respective uplink signals 218a-b may contain various encoded HD (High Definition) television channels, various SD (Standard Definition) television channels, on-demand programming, programming information, cloud-service-related information, and/or any other content in the form of at least one transponder stream and in accordance with an allotted carrier frequency and bandwidth. In this example, different television channels may be carried using different ones of the satellites 206a-M. Different television channels may also be carried using different transponders of a particular satellite (e.g., satellite 206a); thus, such television channels may be transmitted at different frequencies and/or different frequency ranges. For example, a first and second television channel may be carried on a first carrier frequency over a first transponder of satellite 206a, and a third, fourth, and fifth television channel may be carried on second carrier frequency over a first transponder of satellite 206b, or, the third, fourth, and fifth television channel may be carried on a second carrier frequency over a second transponder of satellite 206a, etc.

The satellites 206a-M may further be configured to relay the uplink signals 218a-b to the satellite dish 208 as downlink signals, such as downlink signals 220a-b. Similar to the uplink signals 218a-b, each of the downlink signals 220a-b may contain one or more transponder streams of particular data or content, such as various encoded and/or electronically scrambled television channels, on-demand programming, etc., in accordance with an allotted carrier frequency and bandwidth. The downlink signals 220a-b, however, may not necessarily contain the same content as a corresponding one of the uplink signals 218a-b. For example, the uplink signal 218a may include a first transponder stream containing at least a first group of television channels, and the downlink signal 220a may include a second transponder stream containing at least a second, different group of television channels. In other examples, the first and second group of television channels may have one or more television channels in common. In sum, there may be varying degrees of correlation between the uplink signals 218a-b and the downlink signals 220a-b, both in terms of content and underlying characteristics.

Continuing with the above simplified example, the satellite dish 208 may be provided for use (e.g., on a subscription basis) to receive television channels provided by the service provider 202, satellite uplink 204, and/or satellites 206a-M. For example, the satellite dish 208 may be configured to receive particular transponder streams, or downlink signals (e.g., downlink signals 220a-b), from the satellites 206a-M. Additionally, the television receiver 210, which is communicatively coupled to the satellite dish 208, may subsequently select via tuner, for example, particular transponder streams, and relay the particular transponder streams to the television 212 for display thereon. For example, the satellite dish 208 and the television receiver 210 may, respectively, be configured to receive and relay at least one premium HD-formatted television channel to the television 212. In this example, the premium HD channel may be output to the television 212 from the television receiver 210 in accordance with the HDMI/HDCP content protection technologies. Still other embodiments are possible.

Figure 3:
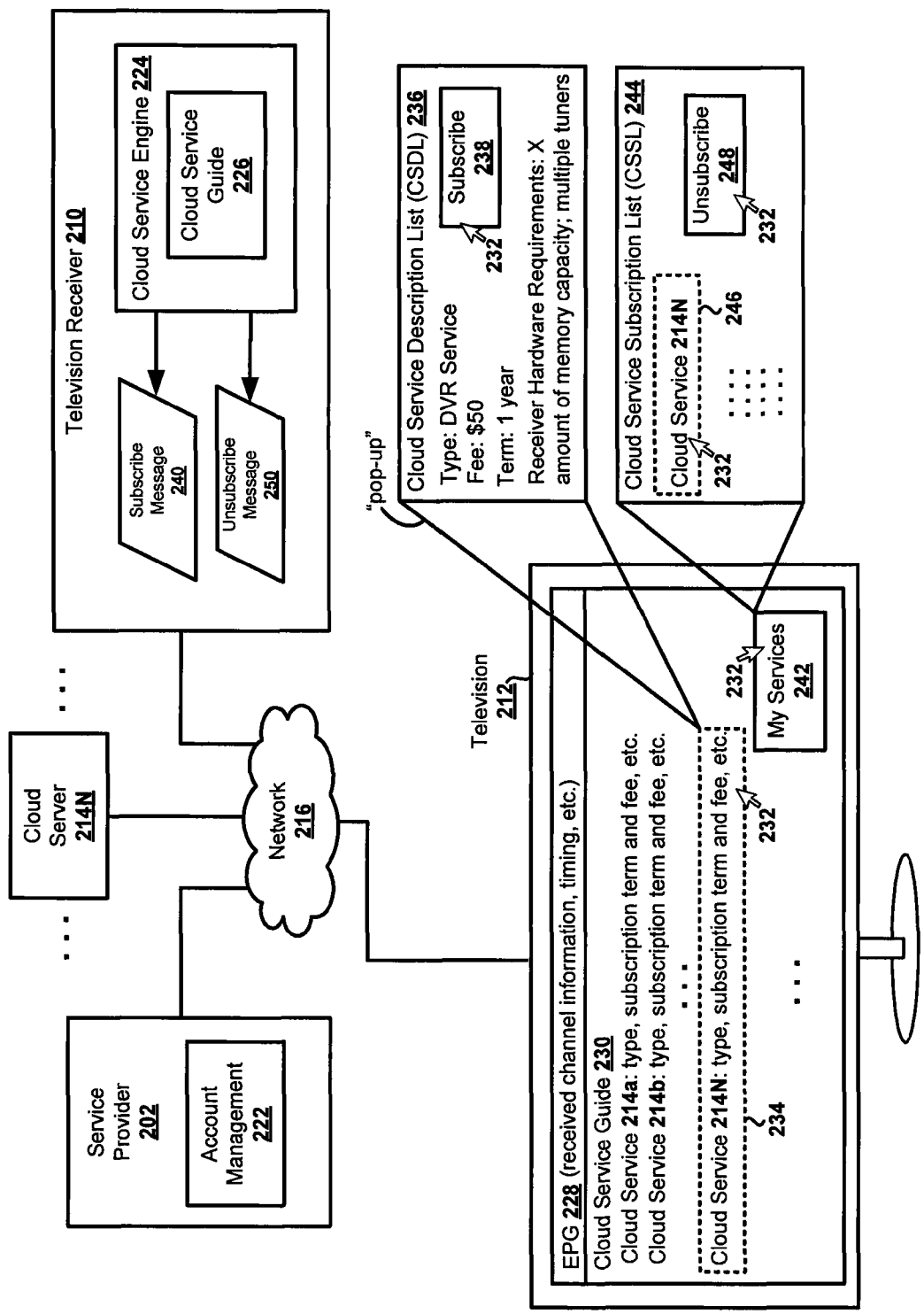
FIG. 3 shows various components of the system of FIG. 2 in further detail.

Referring now to FIG. 3, various components of the system 200 of FIG. 2 are shown in further detail. In particular, the service provider 202 is shown including an account management module 222, and the television receiver 210 is shown including a cloud service engine 224. The example cloud service engine 224 may include a cloud service guide module 226. Other embodiments are possible. For example, the cloud service engine 224 may generally include more or fewer modules as desired, where number and type of modules may or may not be implementation specific. Additionally, respective modules of the service provider 202 and the cloud service engine 224 may be wholly or at least partially incorporated within, or located at, one or more different components or elements. For example, in some embodiments, the account management module 222 may be wholly or at least partially incorporated within the cloud service engine 224. Similarly, in some embodiments, the cloud service guide module 226 may be wholly or at least partially located at the service provider 202. Still other embodiments are possible as well.

In example embodiments, the television receiver 210 may be configured to output one or more interfaces to the television 212. For example, as shown in FIG. 3, the television receiver 210 may be configured to output an EPG (Electronic Programming Guide) 228 to the television 212. The EPG 228 may present various information related to television channels and the timing of programs appearing on such television channels (e.g., as received from satellites 206a-M). The EPG 228 may further enable a user to browse and select programming for viewing and/or recording such as, for example, via DVR (Digital Video Recorder) technology that may, in some embodiments, be incorporated within the television receiver 210. Other embodiments of the EPG 228 are possible. For example, the EPG 228 may generally be any type of interactive guide with continuously updated menus displaying programming or scheduling information for current and upcoming programming, and other features as well.

The television receiver 210 may additionally be configured to output a CSG (Cloud Service Guide) 230 to the television 212, as shown in FIG. 3 in tandem with the EPG 228. In general, information contained within and associated with the CSG 230 may be supplied by the cloud service guide module 226 of the cloud service engine 224. Other embodiments are possible. For example, certain information contained within and associated with the CSG 230 may be supplied by the account management module 222 of the service provider 202, as described in further detail below. Still other embodiments are possible.

The CSG 230 may present "currently available" or "currently accessible" cloud computing services that may be delivered, on a subscription basis for example, to the television receiver 210 and/or to the television 212. The CSG 230 may further present various information associated with particular ones of the "currently available" cloud computing services. For example, as shown in FIG. 3, the CSG 230 may at least present information such as "Cloud Service 214N: type, subscription term and fee, etc." that, in the broadest sense, identifies particular computing resources and services, along with subscription details or particulars, that may be provided by the cloud-based server 214N over the network 216. As an example, "type" may specify a "DVR service" that hosts program recordings "in the cloud," and an example "subscription term and fee" may specify "$50/year." Many other examples are possible as well. For example, "type" may generally specify any particular feature or functionality that may be provided or otherwise supplied by a particular cloud service in a cloud computing implementation. Additionally, "subscription term and fee" may defined at least in accordance with "type" of service provided.

In practice, particular ones of the "currently available" cloud computing services as presented within the CSG 230 may be selectively subscribed to, and/or unsubscribed to, by a particular consumer or customer as desired. For example, in some instances, detailed information associated with a particular "currently available" cloud computing service may be presented upon selection of the particular service within the CSG 230 via a "point and click" gesture using a cursor 232. For example, the cursor 232 may be used to select "Cloud Service 214N," indicated by an intermittent line 234 in FIG. 3, as listed within the CSG 230. In response to the selection, a CSDL (Cloud Service Description List) 236 may be presented that includes various detailed information associated with the "Cloud Service 214N" such as, for example, "Type: DVR Service," and "Fee: $50," and "Term: 1 year." In general, the CSDL 236 may be fully or at least partially superimposed over the CSG 230 and/or EPG 228 as displayed on the television 212.

Many other forms of detailed information may be presented within the CSDL 236 as well. For example, as shown in FIG. 3, detailed information associated with the "Cloud Service 214N" may further specify "Receiver Hardware Requirements: X amount of memory capacity; multiple tuners." Presenting such detailed information may be beneficial in many respects. For example, a particular customer may be informed as to what type of upgrade may be required (e.g., hardware as shown in FIG. 3, but may also include software requirements) to upgrade a "less" sophisticated version of the television receiver 210 to a "more" sophisticated version of the television receiver 210, in order for the television receiver 210 itself to support the features and functionality of the "Type: DVR Service" as listed within the CSDL 236. In some instances, the particular customer or consumer may decide, at least in part based on information as listed within the CSDL 236, that the "Type: DVR Service" is of sufficient interest to justify or provoke the particular consumer to upgrade the "less" sophisticated version of the television receiver 210 to a "more" sophisticated television receiver 210. In this example, the particular consumer may selectively choose to obtain (e.g., purchase) a "more" sophisticated version of the television receiver 210. In another example, the particular consumer may elect to subscribe to the "Type: DVR Service" as provided by the cloud-based server 214N (Cloud Service 214N).

For example, the "Type: DVR Service" may be subscribed to by the particular consumer, as a service to be supplied or provided to the television receiver 210 and/or the television 212, upon selection of a "subscribe" icon 238 service via a "point and click" gesture using a cursor 232. In this example, and in response to selection of the icon 238, a subscribe message 240 may be generated by the cloud service engine 224, and transferred from the television receiver 210 to the account management module 222 of the service provider 202. In at least one aspect, the subscribe message 240 may be used to associate the "Type: DVR Service" with a particular customer account (e.g., which is associated with the particular consumer in the example scenario), which in turn may be used to control and manage cloud services as subscribed to by the particular consumer, both in terms of financial compensation for respective billing parties (e.g., a particular satellite television provider, controlling entity of respective ones of the cloud-based servers 214a-N, etc.) and actual cloud services as supplied to one or both of the television receiver 210 and the television 212.

As mentioned above, particular ones of the "currently available" cloud computing services as presented within the CSG 230 may also be selectively unsubscribed to by a particular consumer or customer as desired. For example, the cursor 232 may be used to select a "My Services" icon 242 as presented within the CSG 230. In response to the selection, a CSSL (Cloud Service subscription List) 244 may be presented that itemizes cloud services associated with a particular customer account (e.g., which is associated with the particular consumer in the example scenario) and/or one or more of the television receiver 210 and the television 212. In general, information contained within and associated with the CSSL 244 may be supplied by the account management module 222 of the service provider 202. However, other embodiments are possible. For example, certain information contained within and associated with the CSSL 244 may be supplied by the cloud service engine 224 of the television receiver 210. Still other embodiments are possible.

In this example, the cursor 232 may be used to initially select the "Cloud Service 214N" identifier within the CSSL 244, indicated by an intermittent line 246 in FIG. 3, and then the "Type: DVR Service" as implemented by the cloud-based server 214N may be unsubscribed to upon selection of an "unsubscribe" icon 248 via a "point and click" gesture the cursor 232. In response to selection of the icon 248, an unsubscribe message 250 may be generated by the cloud service engine 224, and transferred from the television receiver 210 to the account management module 222 of the service provider 202. In at least one aspect, the unsubscribe message 250 may be used to disassociate the "Type: DVR Service" with a particular customer account (e.g., which is associated with the particular consumer in the example scenario), which in turn may be used to control and manage discontinuation of the "Type: DVR Service" as supplied to one or both of the television receiver 210 and the television 212, as well as settling in terms of financial compensation for respective billing parties.

Figure 4:
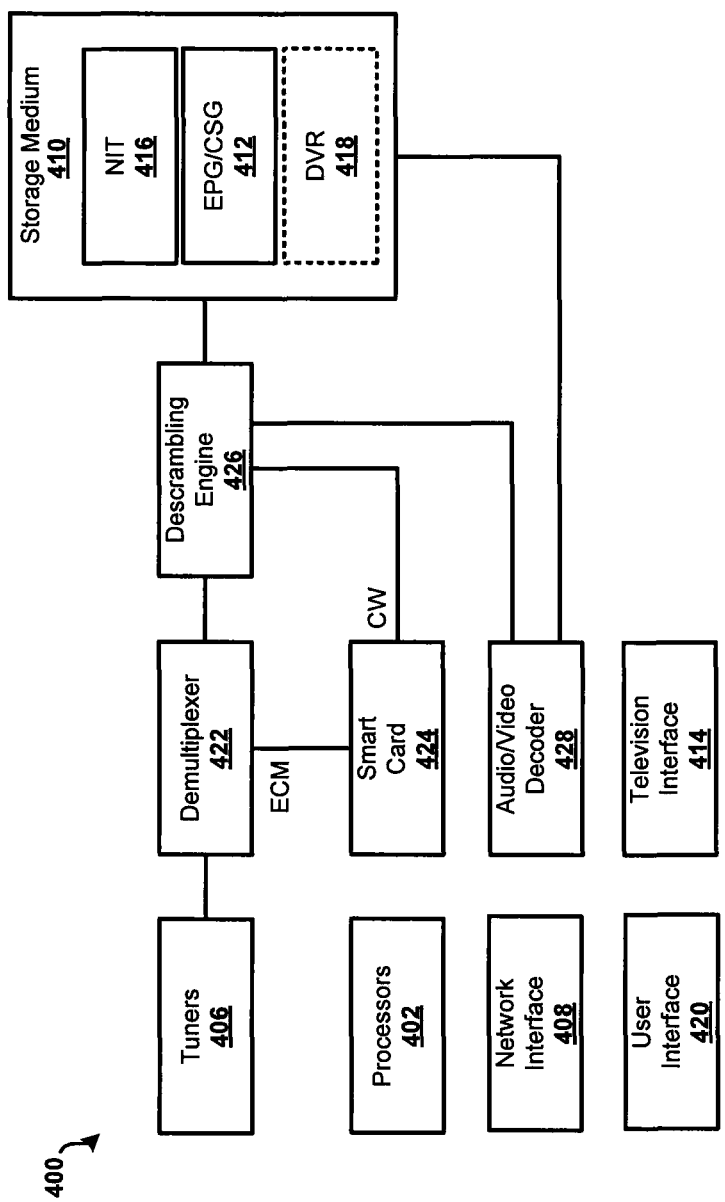
FIG. 4 shows a block diagram of an example set-top-box.

Referring now to FIG. 4, a block diagram of an example STB (Set-Top-Box) 400 is shown. For brevity, one or more elements of the STB 400 may be omitted from the present discussion. Additionally, certain connections may not be shown between certain elements of the STB 400. The STB 400, however, may be configured to include any number of various components or logical modules that are implemented in hardware, software, firmware, or any combination thereof, and such components or logical modules may or may not be implementation specific, and such components or logical modules may be connected or interconnected in any manner as desired. For example, the STB 400 may include one or more logical modules configured to implement a TV steaming media functionality that encodes video into a particular format for transmission over the Internet such as to allow users to remotely view and control a home cable, satellite, or personal video recorder system from an Internet-enabled computer with a broadband Internet connection. Still other embodiments are possible.

The STB 400 may correspond to the television receiver 210, of FIG. 3, or may be incorporated as part of a television, such as television 212 of FIG. 3. Other embodiments are possible as well. In the present example, the STB 400 may include: one or more processors 402, one or more tuners 406, at least one network interface 408, at least one non-transitory computer-readable storage medium 410, at least one EPG/CSG (Electronic Programming Guide/Cloud Service Guide) module 412, at least one television interface 414, at least one NIT (Networking Information Table) module 416, a DVR 418, at least one user interface 420, at least one demultiplexer 422, at least one smart card 424, at least one descrambling engine 426, and at least one audio/video decoder 428. Continuing with the example scenario discussed above in connection with FIG. 1 and FIG. 2, the DVR 418 is shown as an "optional" component or module of the STB 400 (indicated by intermittent line in FIG. 4). In particular, and assuming that a particular cloud service is a DVR-like service that hosts program recordings "in the cloud" (e.g., as hosted by cloud-based server 214N), a particular consumer may upgrade a "thin-client" version of the STB 400, that does not include functionality offered by the DVR 418, to a "more" sophisticated television version of the STB 400, that exhibits a multi-tuner DVR platform offered by the DVR 418 and the tuners 406, etc., such as described in further detail below.

The processor(s) 402 may include one or more general-purpose processors configured to perform processes such as tuning to a particular channel, generating one or more graphical user interfaces, such as the EPG 228, the CSG 230, CSDL 236, and/or CSSL 244 as shown in FIG. 3, and/or receiving and processing various input from a user or user device (e.g., a pointing device such as a remote control). The processor(s) 402 may include one or more special purpose processors. For example, the processor(s) 402 may include one or more processors dedicated to decoding video signals from a particular format, such as MPEG (Motion Picture Experts Group), for output and display on a television (e.g., television 212) and for performing encryption and/or decryption. In general, functions performed by various modules of the STB 400 may be performed using one or more processors. For example, functions of descrambling engine 426 may be performed by the processor(s) 402.

The tuner(s) 406 may include one or more tuners used to tune to television channels, such as television channels transmitted via satellite or cable. Each tuner contained in the tuner(s) 406 may be configured to receive and process a single stream of data from a satellite transponder (or a cable RF channel) at a given time. As such, a single tuner may tune to a single transponder (or cable RF channel). When the tuner(s) 406 include multiple tuners, one tuner may be used to tune to a television channel on a first transponder for display using a television, while another tuner may be used to tune to a television channel on a second transponder for recording and viewing at some other time. Still another tuner may be used to check various television channels to determine if they are available or not. When multiple television channels transmitted on the same transponder stream are desired, a single tuner may be used to receive the signal containing the multiple television channels for presentation and/or recording.

The network interface(s) 408 may be used to communicate via an alternate communication channel with a television service provider. For example, the primary communication channel may be via satellite (which may be unidirectional to the STB 400) and the alternate communication channel (which may be bidirectional) may be via a network, such as the Internet. Referring back to FIG. 2, the STB 400 may be configured to communicate with the service provider 202 via the network 216. This communication may be bidirectional: data may be transmitted from the STB 400 to the service provider 202, and from the service provider 202 to the STB 400. Referring back to FIG. 4, the network interface 408 may be configured to communicate via one or more networks, such as the Internet, to communicate with the service provider 202 of FIG. 2. In particular, information may be transmitted and/or received via the network interface(s) 408.

The storage medium(s) 410 may represent a non-transitory computer readable storage medium. The storage medium 410 may include memory and/or a hard drive. The storage medium 410 may be used to store information received from one or more satellites and/or information received via network interface 408. In the example shown, the storage medium 410 may store information related to the EPG/CSG module 412, the NIT module 416, and/or the DVR 418. Recorded television programs may be stored using the storage medium 410.

The EPG/CSG module(s) 412 may store information related to television channels and the timing of programs appearing on such television channels. The EPG/CSG module 412 may further store information related to one or more cloud computing services. The EPG/CSG module 412 may be stored using the storage medium 410, which may be a hard drive. The EPG/CSG module 412 may be used to inform users of what television channels or programs are popular and/or provide recommendations to the user, and/or what cloud computing services are available for subscription thereto.

The EPG/CSG module 412 may provide the user with a visual interface (e.g., EPG 228) displayed by a television that allows a user to browse and select television channels and/or television programs for viewing and/or recording via the DVR 418. The EPG/CSG module 412 may further provide the user with a visual interface (e.g., CSG 230) displayed by a television that allows a user to browse cloud services for subscription thereto, and to browse details associated with cloud services currently subscribed thereto. Information used to populate the EPG/CSG module 412 may be received via network interface 408 and/or via satellites, such as satellites 206a-M of FIG. 2 via the tuner(s) 206. For instance, updates to the EPG/CSG module 412 may be received periodically or at least intermittently via satellite. The EPG/CSG module 412 may serve as an interface for a user to control the DVR 418 to enable viewing and/or recording of multiple television channels simultaneously.

The audio/video decoder(s) 428 may serve to convert encoded video and/or audio into a format suitable for output to a display device. For instance, the audio/video decoder 428 may receive MPEG video and audio from the storage medium 410 or descrambling engine 426 to be output to a television. The audio/video decoder 428 may convert the MPEG video and/or audio into a format appropriate to be displayed by a television (e.g., television 212) or other form of display device and audio into a format appropriate to be output from speakers, respectively.

The television interface(s) 414 may serve to output a signal to a television (or another form of display device) in a proper format for display of video and playback of audio. As such, the television interface 414 may output one or more television channels, stored television programing from the storage medium 410 such as, for example, the DVR 418 and/or information from the EPG/CSG module 412, to a television for presentation.

The NIT module(s) 416 may store information used by the STB 400 to access various television channels. The NIT module 416 may be stored using the storage medium 410. Information used to populate the NIT module 416 may be received via satellite (or cable) through the tuner(s) 406 and/or may be received via the network interface 408 from the service provider 202 of FIG. 2. As such, information present in NIT module 416 may be periodically or at least intermittently updated. The NIT module 416 may be locally-stored by the STB 400 using the storage medium 410. Information that may be present in NIT module 416 may include: television channel numbers, a satellite identifier, a frequency identifier, a transponder identifier, an ECM (Entitlement Control Message) PID (Packet Identifier), one or more audio PIDs, and a video PID. A second audio PID of a channel may correspond to a second audio program, such as in another language. In some embodiments, the NIT module 416 may be divided into additional tables. For example, rather than the specific audio PIDs and video PIDs being present in the NIT module 416, a channel identifier may be present within NIT module 416 which may be used to lookup the audio PIDs and video PIDs in another table.

The DVR 418 may permit a television channel to be recorded for a period of time. The DVR 418 may store timers that are used by the processor(s) 402 to determine when a television channel should be tuned to and recorded. In some embodiments, a limited amount of storage medium 410 may be devoted to recorded programming. Timers may be set by the television service provider and/or one or more users of the STB 400. The DVR 418 may be configured by a user to record particular television programs. Whether a user directly tunes to a television channel or the DVR 418 tunes to a first television channel, the NIT module 416 may be used to determine the satellite, transponder, ECM PID (packet identifier), audio PID, and video PID such that particular programming may be recorded as desired.

The user interface(s) 420 may include a remote control (physically separate from STB 400) and/or one or more buttons on the STB 400 that allows a user to interact with the STB 400. In one example, the user interface 420 may be used to view and interact with the EPG 228 and various interfaces associated with the CSG 230, and/or program the DVR 418 as desired. Other embodiments are possible.

Referring back to the tuner(s) 406, television channels received via satellite (or cable) may contain at least some encrypted data. Packets of audio and video may be scrambled to prevent unauthorized users (e.g., nonsubscribers) from receiving television programming without paying the television service provider. When a tuner is receiving data from a particular transponder of a satellite, the transponder stream may be a series of data packets corresponding to multiple television channels. Each data packet may contain a PID, which in combination with the NIT module 416, can be determined to be associated with a particular television channel. Particular data packets, referred to as ECMs may be periodically or at least intermittently transmitted. ECMs may be encrypted/decrypted; the STB 400 may use the smart card 424 to decrypt ECMs. Decryption of an ECM may only be possible when a user, or particular customer account associated with the user, has authorization to access the particular television channel associated with the ECM. When an ECM is received by the demultiplexer 422, and the ECM is determined to correspond to a television channel being stored and/or displayed, the ECM may be provided to the smart card 424 for decryption.

When the smart card 424 receives an encrypted ECM from the demultiplexer 422, the smart card 424 may decrypt the ECM to obtain some number of control words. In some embodiments, from each ECM received by the smart card 424, two (2) control words may be obtained. In some embodiments, when the smart card 424 receives an ECM, it compares the ECM to the previously received ECM. When the two ECMs match, the second ECM is not decrypted because the same control words would be obtained. In other embodiments, each ECM received by the smart card 424 is decrypted; however, when a second ECM matches a first ECM, the outputted control words will match; thus, effectively, the second ECM does not affect the control words output by the smart card 424. When an ECM is received by the smart card 424, it may take a period of time for the ECM to be decrypted to obtain the control words. As such, a period of time, such as two (2) seconds, may elapse before the control words indicated by the ECM can be obtained. The smart card 424 may be permanently part of STB 400 or maybe configured to be inserted and removed from STB 400.

The demultiplexer 422 may be configured to filter data packets based on PIDs. For example, when a transponder data stream includes multiple television channels, data packets corresponding to a television channel that is not desired to be stored or displayed by the user, may be ignored by the demultiplexer 422. As such, only data packets corresponding to the one or more television channels desired to be stored and/or displayed may be passed to either the descrambling engine 426 or the smart card 424, other data packets may be ignored. For each channel, a stream of video packets, a stream of audio packets and/or a stream of ECM packets may be present, each stream identified by a PID. In some embodiments, a common ECM stream may be used for multiple television channels. Additional data packets corresponding to other information, such as updates to NIT module 416, may be routed by the demultiplexer 422.

The descrambling engine 426 may use the control words output by the smart card 424 to descramble video and/or audio corresponding to television channels for storage and/or presentation. Video and/or audio data contained in the transponder data stream received by tuner(s) 406 may be scrambled. The video and/or audio may be descrambled by the descrambling engine 426 using a particular control word. Which control word output by the smart card 424 to be used for successful descrambling may be indicated by a scramble control identifier present within the data packet containing the scrambled video or audio. Descrambled video and/or audio may be output by the descrambling engine 426 to the storage medium 410 for storage (e.g., via the DVR 418) and/or to audio/video decoder 428 for output to a television or other presentation equipment via the television interface 414.

Figure 5:
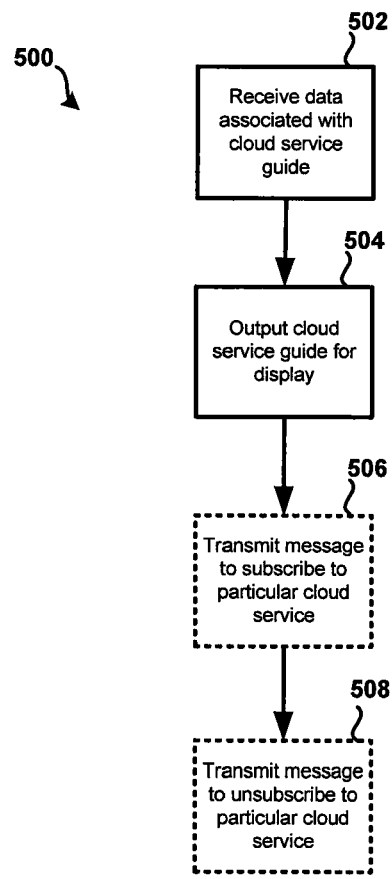
FIG. 5 shows a flowchart of an example method for configuring television receivers in a content distribution.

Referring now to FIG. 5, an example method 500 for configuring television receivers in a content distribution network is shown in accordance with the principles of the present disclosure. In general, the method 500 may be implemented by the television receiver 210 as described above in connection with FIGS. 1-4. Other embodiments are possible. For example, one or more modules of the example method 500 may be implemented by one or more of the other respective devices or components within the example system 200 described above. Still other embodiments are possible.

The example method 500 may include receiving (module 502), at the television receiver 210 from the service provider 202 via at least one of the satellites 206a-M, data associated with the CSG 230. In at least one aspect, the CSG 230 may present "currently available" or "currently accessible" cloud computing services, as implemented by respective ones of the cloud-based servers 214a-N, that may be delivered to the television receiver 210 and/or to the television 212 over the network 216. Other embodiments are possible as well. For example, concepts as discussed with respect to the example method 500 may be applicable to any type or form of networked computing system environment, and may not be limited to a satellite television system implementation, or other particular implementation.

The example method 500 may further include outputting (module 504), from television receiver 210 to the television 212, the CSG 230 for display or presentation to at least one user or customer of a particular satellite television provider. In general, the customer may access any of a plurality of information associated with "currently available" or "currently accessible" cloud computing services. Such an implementation is beneficial in many respects. For example, the user may be informed as to what type of upgrade may be required (e.g., hardware and/or software) to upgrade a "less" sophisticated version of the television receiver 210 to a "more" sophisticated version of the television receiver 210. In some instances, the customer may decide, at least in part based on accessed information associated with "currently available" or "currently accessible" cloud computing services, whether a particular service is of sufficient interest to justify or provoke the particular customer to upgrade the "less" sophisticated version of the television receiver 210 to a "more" sophisticated television receiver 210. In other instances, the particular consumer may elect to subscribe to the particular service, instead of electing to upgrade the "less" sophisticated version of the television receiver 210 to a "more" sophisticated television receiver 210.

For example, the method 500 may optionally, as indicated by intermittent line in FIG. 5, further include transmitting (module 506), from the television receiver 210 to the service provider 202, and in response to a user-initiated activation request, the subscribe message 240 to enable access by the television receiver 210 to a particular cloud computing service listed within the CSG 230. For example, the "Type: DVR Service" as described above may be subscribed to by the customer, as a service to be supplied or provided to the television receiver 210 and/or the television 212, upon selection of the icon 238 via a "point and click" gesture using the cursor 232, as shown in FIG. 3. In response to selection of the icon 238, the subscribe message 240 may be generated by the cloud service engine 224, and transferred from the television receiver 210 to the account management module 222 of the service provider 202. Subsequently, the cloud-based server 214N may be configured such as to enable access by the television receiver 210 and/or the television 212 to the "Type: DVR Service" as implemented or otherwise provided by the cloud-based server 214N. Other embodiments are possible as well. For example, it is contemplated that any particular feature or functionality that may be provided in a cloud computing implementation may, at least in part, be subscribed to and accessed by an appropriately configured computing device (e.g., television receiver 210, television 212, etc.).

In another example, the method 500 may optionally, as indicated by intermittent line in FIG. 5, further include transmitting (module 508), from the television receiver 210 to the service provider 202, and in response to a user-initiated deactivation request, the unsubscribe message 250 to deactivate or otherwise disable access by the television receiver 210 to a particular cloud computing service listed within the CSG 230. For example, the "Type: DVR Service" as described above may be unsubscribed to by the customer, as a service to be supplied or provided to the television receiver 210 and/or the television 212, upon selection of the icon 248 via a "point and click" gesture using the cursor 232, as shown in FIG. 3. In response to selection of the icon 248, the unsubscribe message 250 may be generated by the cloud service engine 224, and transferred from the television receiver 210 to the account management module 222 of the service provider 202. Subsequently, the cloud-based server 214N may be configured such as to disable or prevent access by the television receiver 210 and/or the television 212 to the "Type: DVR Service" as implemented or otherwise provided by the cloud-based server 214N. Other embodiments are possible as well. 212.

Figure 6:
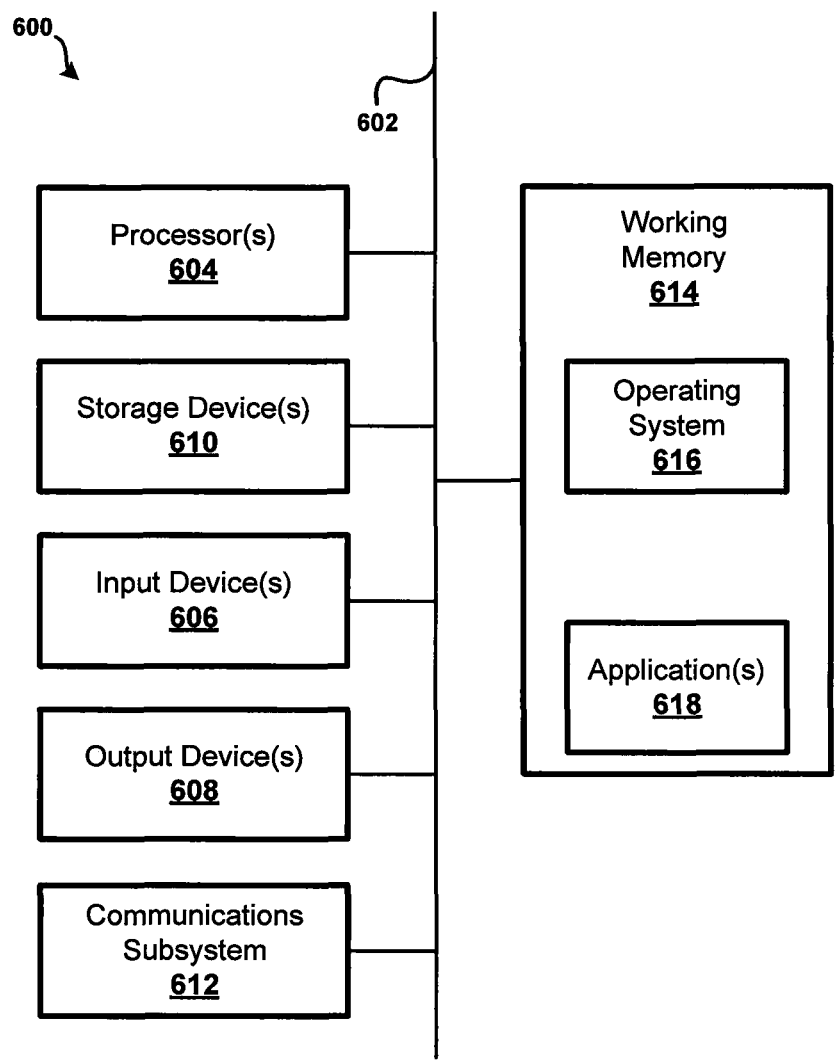
FIG. 6 shows an example computing system or device.

Referring now to FIG. 6, an embodiment of an example computer system or device 600 is shown. An example of a computer system or device includes an enterprise server, blade server, desktop computer, laptop computer, personal data assistant, smartphone, gaming console, set-top-box, and any other type machine for performing calculations. The computer system 600 may be wholly or at least partially incorporated as part of previously-described computing devices, such as the service provider 202, the television receiver 210, the television 212, and respective ones of the plurality of cloud-based servers 214a-N of FIG. 2, as well as the STB 400 of FIG. 4. The example computer device 600 may be configured to perform and/or include instructions that, when executed, cause the computer system 600 to perform the method of FIG. 5. It should be noted that FIG. 6 is intended only to provide a generalized illustration of various components, any or all of which may be utilized as appropriate. FIG. 6, therefore, broadly illustrates how individual system elements may be implemented in a relatively separated or relatively more integrated manner.

The computer device 600 is shown comprising hardware elements that may be electrically coupled via a bus 602 (or may otherwise be in communication, as appropriate). The hardware elements may include a processing unit with one or more processors 604, including without limitation one or more general-purpose processors and/or one or more special-purpose processors (such as digital signal processing chips, graphics acceleration processors, and/or the like); one or more input devices 606, which can include without limitation a remote control, a mouse, a keyboard, and/or the like; and one or more output devices 608, which can include without limitation a presentation device (e.g., television), a printer, and/or the like.

The computer system 600 may further include (and/or be in communication with) one or more non-transitory storage devices 610, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer device 600 might also include a communications subsystem 612, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities (e.g., GSM, WCDMA, LTE, etc.), and/or the like. The communications subsystem 612 may permit data to be exchanged with a network (such as the network described below, to name one example), other computer systems, and/or any other devices described herein. In many embodiments, the computer system 600 will further comprise a working memory 614, which can include a RAM or ROM device, as described above.

The computer device 600 also can comprise software elements, shown as being currently located within the working memory 614, including an operating system 616, device drivers, executable libraries, and/or other code, such as one or more application programs 618, which may comprise computer programs provided by various embodiments, and/or may be designed to implement methods, and/or configure systems, provided by other embodiments, as described herein. Merely by way of example, one or more procedures described with respect to the method(s) discussed above, and/or system components might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 610 described above. In some cases, the storage medium might be incorporated within a computer system, such as computer system 600. In other embodiments, the storage medium might be separate from a computer system (e.g., a removable medium, such as flash memory), and/or provided in an installation package, such that the storage medium can be used to program, configure, and/or adapt a general purpose computer with the instructions/code stored thereon. These instructions might take the form of executable code, which is executable by the computer device 600 and/or might take the form of source and/or installable code, which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 600) to perform methods in accordance with various embodiments of the invention. According to a set of embodiments, some or all of the procedures of such methods are performed by the computer system 600 in response to processor 604 executing one or more sequences of one or more instructions (which might be incorporated into the operating system 616 and/or other code, such as an application program 618) contained in the working memory 614. Such instructions may be read into the working memory 614 from another computer-readable medium, such as one or more of the storage device(s) 610. Merely by way of example, execution of the sequences of instructions contained in the working memory 614 may cause the processor(s) 604 to perform one or more procedures of the methods described herein.

The terms "machine-readable medium" and "computer-readable medium," as used herein, refer to any medium that participates in providing data that causes a machine to operate in a specific fashion. In an embodiment implemented using the computer device 600, various computer-readable media might be involved in providing instructions/code to processor(s) 604 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 610. Volatile media include, without limitation, dynamic memory, such as the working memory 614.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 604 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 612 (and/or components thereof) generally will receive signals, and the bus 602 then might carry the signals (and/or the data, instructions, etc. carried by the signals) to the working memory 614, from which the processor(s) 604 retrieves and executes the instructions. The instructions received by the working memory 614 may optionally be stored on a non-transitory storage device 610 either before or after execution by the processor(s) 604.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for configuring television receivers in a content distribution network, comprising:
   receiving, at a television receiver from a computing system over a television broadcast network, data associated with an interactive guide that lists cloud computing services each that provide particular applications and services over a data network;
   outputting, from the television receiver to a display device, the interactive guide for presentation to at least one customer of a particular television provider;
   outputting, from the television receiver to the display device, an interface that lists specification information associated with a DVR (Digital Video Recorder) cloud computing service listed within the interactive guide, the specification information including DVR cloud service subscription fee, DVR cloud service subscription term, and hardware requirement of the television receiver to implement the DVR cloud computing service;
   transmitting, from the television receiver to the computing system in response to a user-initiated activation request, a subscribe message to enable access by the television receiver to the DVR cloud computing service listed within the interactive guide; and
   transmitting, from the television receiver to the computing system in response to a user-initiated deactivation request, an unsubscribe message to disable access by the television receiver to the DVR cloud computing service listed within the interactive guide.

2. The method of claim 1, further comprising: receiving the user-initiated activation request; and enabling access by the television receiver to the DVR cloud computing service.

3. The method of claim 2, further comprising associating access activation to the DVR cloud computing service with a particular customer account of the particular television provider.

4. The method of claim 1, further comprising: receiving the user-initiated deactivation request; and disabling access by the television receiver to the DVR cloud computing service.

5. The method of claim 4, further comprising associating access deactivation to the DVR cloud computing service with a particular customer account of the particular television provider.

6. A television receiver, comprising:
   a processing unit; and
   a system memory connected to the processing unit, the system memory including instructions that, when executed by the processing unit, cause the processing unit to:
   output for presentation by a display device an interface that lists specification information associated with a DVR (Digital Video Recorder) cloud computing service listed within an interactive guide, the specification information including DVR cloud computing service subscription fee, DVR cloud computing service subscription term, and hardware requirement of the television receiver to implement the DVR cloud computing service;
   transmit a subscribe message to enable access by the television receiver to the DVR cloud computing service listed within the interactive guide; and
   transmit an unsubscribe message to disable access by the television receiver to the DVR cloud computing service listed within the interactive guide.

7. The television receiver of claim 6, wherein the instructions that, when executed by the processing unit, cause the processing unit to output for presentation by the display device the interactive guide, the interactive guide including a list of cloud computing services, including the DVR cloud computing service, each that provide particular applications and services over a data network.

8. The television receiver of claim 6, wherein the instructions that, when executed by the processing unit, cause the processing unit to enable access by the television receiver to the DVR cloud computing service.

9. The television receiver of claim 8, wherein the instructions that, when executed by the processing unit, cause the processing unit to associate access activation to the DVR cloud computing service with a particular customer account of a particular television provider.

10. The television receiver of claim 6, wherein the instructions that, when executed by the processing unit, cause the processing unit to disable access by the television receiver to the DVR cloud computing service.

11. The television receiver of claim 10, wherein the instructions that, when executed by the processing unit, cause the processing unit to associate access deactivation to the DVR cloud computing service with a particular customer account of a particular television provider.

12. A computing device, comprising:
   a processing unit; and
   a system memory connected to the processing unit, the system memory including instructions that, when executed by the processing unit, cause the processing unit to:
   output to a display device for presentation thereby an interactive guide that lists cloud computing services each that provide particular applications and services over a data network;
   output to the display device for presentation thereby an interface that lists specification information associated with a DVR (Digital Video Recorder) cloud computing service listed within an interactive guide, the specification information including DVR cloud computing service subscription fee, DVR cloud computing service subscription term, and hardware requirement of the television receiver to implement the DVR cloud computing service;
   transmit a subscribe message to enable access by the computing device to the DVR cloud computing service listed within the interactive guide; and
   transmit an unsubscribe message to disable access by the computing device to the DVR cloud computing service listed within the interactive guide.

13. The computing device of claim 12, the system memory further including instructions that, when executed by the processing unit, cause the processing unit to output for display the interactive guide for presentation to at least one customer of a particular satellite television provider.

14. The computing device of claim 12, the system memory further including instructions that, when executed by the processing unit, cause the processing unit to enable access by the computing device to the DVR cloud computing service, and associate access activation to the DVR cloud computing service with a particular customer account of a particular satellite television provider.

15. The computing device of claim 12, the system memory further including instructions that, when executed by the processing unit, cause the processing unit to disable access by the computing device to the DVR cloud computing service, and associate access deactivation to the DVR cloud computing service with a particular customer account of a particular satellite television provider.

* * * * *